(12) United States Patent
Lee et al.

(10) Patent No.: US 9,798,897 B2
(45) Date of Patent: Oct. 24, 2017

(54) ENCODER AND METHOD FOR ENCODING THEREOF

(71) Applicant: SAMSUNG ELECTRONICS CO., LTD., Suwon-si (KR)

(72) Inventors: Yong Ki Lee, Yongin-si (KR); Yun-Ho Youm, Seoul (KR); Hong-Mook Choi, Hwasung (KR); Jinsu Hyun, Yongin-si (KR); KeeMoon Chun, Seongnam-si (KR)

(73) Assignee: SAMSUNG ELECTTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/577,608

(22) Filed: Dec. 19, 2014

(65) Prior Publication Data

US 2015/0254476 A1 Sep. 10, 2015

(30) Foreign Application Priority Data

Mar. 4, 2014 (KR) ........................ 10-2014-0025608

(51) Int. Cl.
*G06F 21/72* (2013.01)
*G06F 21/55* (2013.01)
(Continued)

(52) U.S. Cl.
CPC ............ *G06F 21/72* (2013.01); *G06F 21/556* (2013.01); *G09C 1/00* (2013.01); *H04L 9/003* (2013.01); *H04L 2209/34* (2013.01)

(58) Field of Classification Search
CPC .......... G06F 21/556; G06F 21/72; G06F 7/48; G06F 7/575; G06F 7/49921; G06F 2207/3876
(Continued)

(56) References Cited

U.S. PATENT DOCUMENTS 4,873,659 A * 10/1989 Licciardi ................. G06F 7/575
 708/670
5,012,246 A * 4/1991 Chung ................. H03M 1/0872
 341/160

(Continued)

FOREIGN PATENT DOCUMENTS

EP 1 465 365 A1 10/2004
KR 10-0461714 B1 2/2005
(Continued)

OTHER PUBLICATIONS

Guido Bertoni et al., "Power-efficient ASIC Synthesis of Cryptographic Sboxes", Proceedings of the 14th ACM Great Lakes symposium on VLSI (GLSVLSI'04), pp. 277-281.

(Continued)

*Primary Examiner* — Thanhnga B Truong
(74) *Attorney, Agent, or Firm* — Sughrue Mion, PLLC (57) ABSTRACT

A method of encoding and an encoder are provided. The method includes generating first one-hot bits for most significant bits (MSBs) and second one-hot bits for least significant bits (LSBs) using input one-hot bits; encoding the first one-hot bits to the MSBs and complementary MSBs through a first logical operation using a cross-connection; and encoding the second one-hot bits to the LSBs and complementary LSBs through a second logical operation using a cross-connection. The encoder includes a first bit generator, a first encoder, a second bit generator and a second encoder.

20 Claims, 10 Drawing Sheets

(51) Int. Cl.
*G09C 1/00* (2006.01)
*H04L 9/00* (2006.01)

(58) Field of Classification Search
USPC ........ 713/192; 341/159, 160, 50, 51, 60, 61,
341/63; 370/384, 474, 359, 362, 412,
370/462; 710/107, 110, 111, 113, 120,
710/243, 317; 711/E12.026, E12.096;
708/702, 670
See application file for complete search history.

(56) References Cited

U.S. PATENT DOCUMENTS

| | | | |
|---|---|---|---|
| 7,057,546 B1 * | 6/2006 | Secatch | G06F 7/74 |
| | | | 341/159 |
| 7,502,464 B2 | 3/2009 | Macchetti et al. | |
| 7,504,970 B2 * | 3/2009 | Fulcomer | H03M 7/40 |
| | | | 341/50 |
| 7,924,057 B2 | 4/2011 | Verbauwhede et al. | |
| 8,750,497 B2 | 6/2014 | Choi et al. | |
| 2004/0228482 A1 | 11/2004 | Macchetti et al. | |
| 2008/0224727 A1 | 9/2008 | Verbauwhede et al. | |
| 2011/0129085 A1 | 6/2011 | Choi et al. | |

FOREIGN PATENT DOCUMENTS

| | | |
|---|---|---|
| KR | 10-0574767 B1 | 4/2006 |
| KR | 10-2011-0061280 A | 6/2011 |

OTHER PUBLICATIONS

Lu Xiao et al., "Hardware design and analysis of block cipher components", The 5th International Conference on Information Security and Cryptology—ICISC 2002 (LNCS 2587), pp. 164-181.

Matteo Giaconia et al., "Area and Power Efficient Synthesis of DPA-Resistant Cryptographic S-Boxes", 20th International Conference on VLSI Design, 2007, pp. 731-737.

Dong-Geon Lee et al., "Reset Tree-Based Optical Fault Detection", Sensors 2013, 13, ISSN 1424-8220, pp. 6713-6729.

* cited by examiner

ENCODER AND METHOD FOR ENCODING THEREOF

CROSS-REFERENCE TO RELATED APPLICATIONS

This U.S. non-provisional patent application claims priority from Korean Patent Application No. 10-2014-0025608, filed on Mar. 4, 2014, the entire contents of which are hereby incorporated by reference.

BACKGROUND

Apparatuses and methods consistent with exemplary embodiments relate to an encoder resistant to a power analysis attack and a method for encoding thereof.

Security processors apply countermeasures with respect to a side channel analysis (SCA). In particular, a countermeasure with respect to a power analysis attack using a difference of power consumption is used.

SUMMARY

According to an aspect of an exemplary embodiment, there is provided a method for encoding of an encoder, the method including generating first one-hot bits for most significant bits (MSBs) and second one-hot bits for least significant bits (LSBs) using input one-hot bits; and encoding the first one-hot bits to the MSBs and complementary MSBs through a first logical operation using a cross-connection; encoding the second one-hot bits to the LSBs and complementary LSBs through a second logical operation using a cross-connection.

According to an aspect of another exemplary embodiment, there is provided an encoder including a first bit generator configured to generate $2^{n/2}$ one-hot bits or $2^{n/2}$ one-cold bits for most significant bits (MSBs) using input $2^n$ bits; a second bit generator configured to generate $2^{n/2}$ one-hot bits or $2^{n/2}$ one-cold bits for least significant bits (LSBs) using the input $2^{n/2}$ bits; a first encoder configured to encode outputs of the first bit generator into the MSBs and complementary MSBs through a first logical operation using a cross-connection; and a second encoder configured to encode outputs of the second bit generator into the LSBs and complementary LSBs through a second logical operation using a cross-connection.

According to an aspect of another exemplary embodiment, there is provided an bit encoder comprising a first logic group configured to generate most significant bits (MSBs) and complementary MSBs of a $2^{n/2}$ bit output from input $2^n$ bits using a plurality of first logic gates, a portion of which are electrically connected using cross-connections; and a second logic group configured to generate least significant bits (LSBs) and complementary LSBs of a $2^{n/2}$ bit output from the input $2^n$ bits using a plurality of second logic gates, a portion of which are electrically connected using cross-connections.

BRIEF DESCRIPTION OF THE FIGURES

The above and other aspects will be described below in more detail with reference to exemplary embodiments, the accompanying drawings, in which.

DETAILED DESCRIPTION

Exemplary embodiments will be described more fully hereinafter with reference to the accompanying drawings, in which exemplary embodiments are shown. The inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

To prevent a power analysis attack, dependence of power consumption on an input value has to be removed. One of the methods used to reduce dependence of power consumption is a dual-rail.

Figure 1:
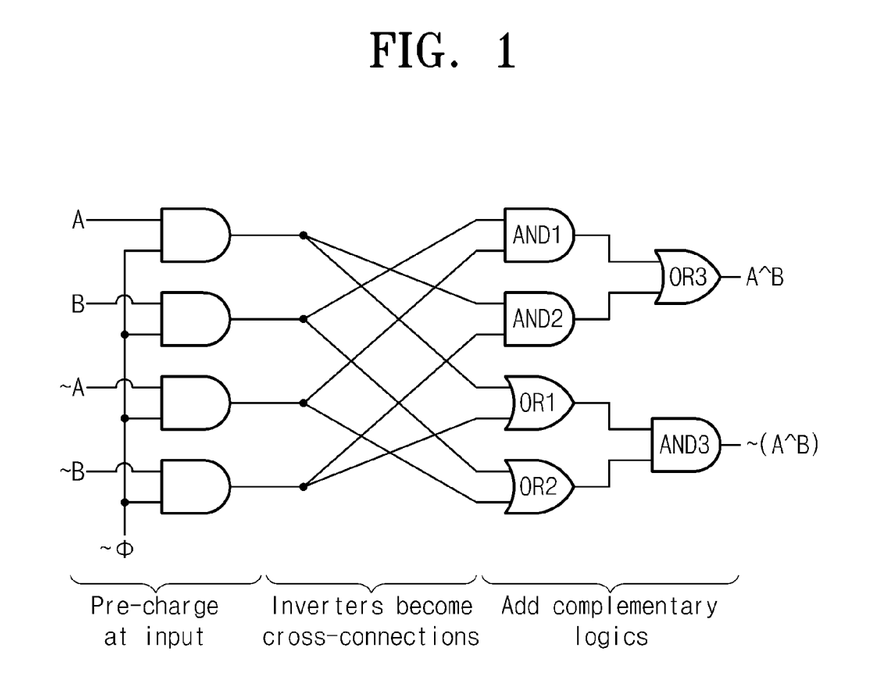
FIG. 1 is a diagram illustrating a dual-rail XOR logic circuit.

FIG. 1 is a diagram illustrating a dual-rail XOR logic circuit. Referring to FIG. 1, Φ is a clock signal. When the clock signal Φ is high (~Φ=0), inputs are all cleared through AND gates AND1 and AND2. After that, when the clock signal Φ is low (~Φ=1), an effective input value is evaluated. At this time, inverted values with respect to all the input values are evaluated at the same time. Complementary logic is evaluated with respect to all the logics together and thereby the same number of toggles is generated.

As illustrated in FIG. 1, all the inverter logics are replaced with cross-connection. Consequently, a side channel analysis is defended by consuming the same quantity of power regardless of input values A and B. The disadvantage of the dual-rail logic is the increased circuit area used. The dual channel logic uses a circuit area roughly more than two times as compared with that of a general logic.

If input values (A, B, ~A, ~B) of FIG. 1 are values that passed through a precharge logic through the clock signal Φ, the precharge logic may be omitted.

The dual-rail method can be embodied by various forms of logics according to crypto algorithm. For example, the dual-rail method can be embodied by a one-hot encoder. A general one-hot encoder is input with a signal of $2^n$ bits and outputs a signal of n bits as an encoding result. Table 1 below illustrates an example of a 16-to-4 one-hot encoding.

TABLE 1

| input | output |
|---|---|
| 0000_0000_0000_0001 | 0000 |
| 0000_0000_0000_0010 | 0001 |
| 0000_0000_0000_0100 | 0010 |
| 0000_0000_0000_1000 | 0011 |
| 0000_0000_0001_0000 | 0100 |
| 0000_0000_0010_0000 | 0101 |
| 0000_0000_0100_0000 | 0110 |
| 0000_0000_1000_0000 | 0111 |
| 0000_0001_0000_0000 | 1000 |
| 0000_0010_0000_0000 | 1001 |
| 0000_0100_0000_0000 | 1010 |
| 0000_1000_0000_0000 | 1011 |
| 0001_0000_0000_0000 | 1100 |
| 0010_0000_0000_0000 | 1101 |
| 0100_0000_0000_0000 | 1110 |
| 1000_0000_0000_0000 | 1111 |

Figure 2:
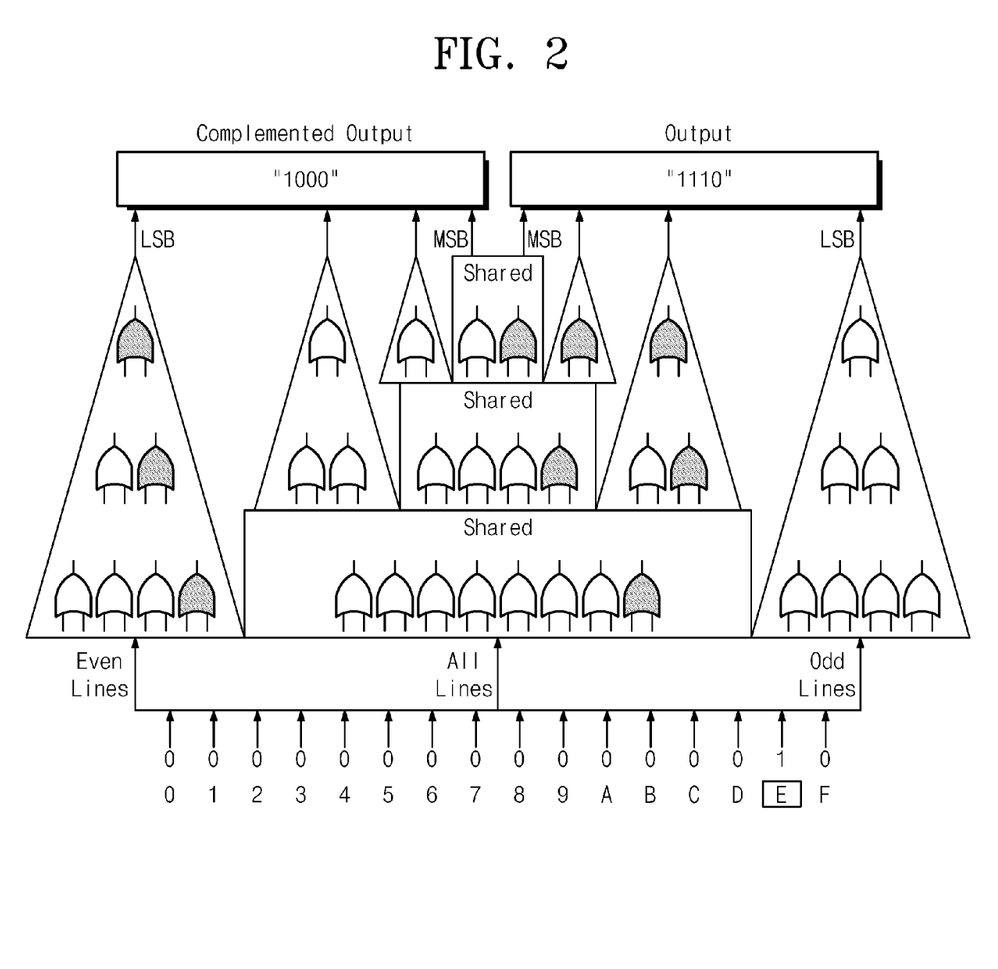
FIG. 2 is a diagram illustrating a 16-to-4 one-hot encoder.

FIG. 2 is a diagram illustrating a 16-to-4 one hot encoder. Referring to FIG. 2, the number of gates being toggled is always the same regardless of input values. However, more gates are needed when a side channel analysis countermeasure is applied to the one hot encoder. In the case of the one hot encoder of FIG. 2, 36 OR gates are needed. Similarly, the number of OR gates needed in a $2^n$-to-n one hot encoder satisfy Equation 1 below.

$$f(1) = 0$$

$$f(n) = f(n-1) + 2^{n-1} + 2\sum_{k=0}^{n-2} 2^k, n \geq 2$$

[Equation 1]

In the case that n is 1, since an output value of the one hot encoder is the same as an input value, the number of gates being consumed in the one hot encoder is zero. In the case that n is 2 or more, as illustrated in FIG. 2, the number of gates can be inferred inductively. That is, it may be thought to be divided into an even line processing part, an odd line processing part, a shared line processing part and a $2^{n-1}$-to-(n−1) encoder part. The mathematical formula 1 can be simplified as follows in Equation 2.

$$f(1)=0$$

$$f(n)=2^{n+1}+2^n-2n-4, n \geq 2$$

[Equation 2]

When n=4, $f(4)=2^5+2^4-8-4=36$

As inferred in FIG. 2, propagation complexity corresponds to (n−1) number of OR gates. A part encoding a least significant bit (LSB) can reduce a delay depth by using a high fan-in gate such as 4-input OR gate. However, since the Shared cannot be replaced with a high fan-in gate, a critical path delay is not reduced.

An encoder in accordance with some exemplary embodiments separates the most significant bits (MSB) and the least significant bits (LSB), and encodes the separated MSB bits and the separated LSB bits respectively. In a final step, each 2 bits are determined to be "10" or "01" according to the encoded 1 bit. That is, an encoding method is performed in a "divide and conquer" method.

The encoder includes a first bit generator generating $2^{n/2}$ one-hot or one-cold bits for MSB using input $2^n$ bits, a second bit generator generating $2^{n/2}$ one-hot or one-cold bits for LSB using input $2^n$ bits, a first encoder encoding outputs of the first bit generator into the MSB and complementary MSB complementary to the MSB through a first logic operation using a cross-connection, and a second encoder encoding outputs of the second bit generator into the LSB and complementary LSB complementary to the LSB through a second logic operation using a cross-connection.

Figure 3:
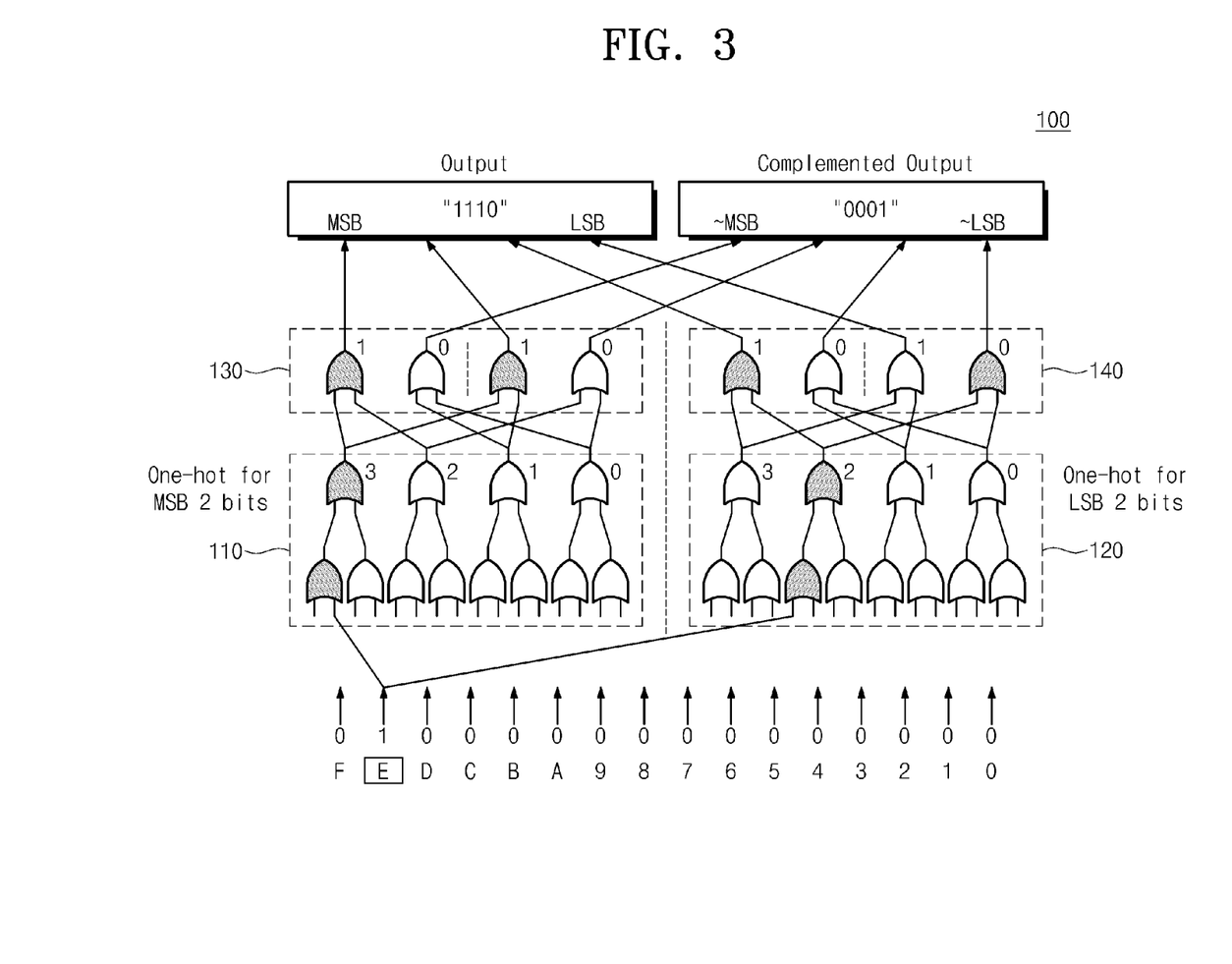
FIG. 3 is a diagram illustrating a 16-to-4 encoder in accordance with some exemplary embodiments.

FIG. 3 is a diagram illustrating a 16-to-4 encoder in accordance with some exemplary embodiments. Referring to FIG. 3, the encoder 100 includes a first bit generator 110, a second bit generator 120, a first encoder 130 and a second encoder 140. The first bit generator 110 and the first encoder 130 may form a first logic group and the second bit generator 120 and the second encoder 140 may form a second logic group.

The first bit generator 110 and the second bit generator 120 can be input with 16 bits to output 4 one-hot bits respectively. Each of the first bit generator 110 and the second bit generator 120 can perform a 2-input OR operation on 16-bits and can perform a 2-bit OR operation on a result value of the 2-input OR operation.

The first encoder 130 can encode output values (4-one hot bits) of the first bit generator 110 into the most significant bits (MSBs) and the complementary most significant bits (~MSBs) through a 2-input OR operation using a cross-connection.

The second encoder 140 can encode output values (4 one-hot bits) of the second bit generator 120 into the least significant bits (LSBs) and the complementary least significant bits (~LSBs) through a 2-input OR operation using a cross-connection.

Referring to FIG. 3, the number of OR gates used can be expressed by a mathematical formula below.

$$f(1) = 0$$

$$f(n) = 2\left\{f\left(\frac{n}{2}\right) + 2^{n/2}(2^{n/2} - 1)\right\}$$

$$= 2\left\{f\left(\frac{n}{2}\right) + 2^n - 2^{n/2}\right\}, n \geq 2$$

[mathematical formula 3]

Herein, it is assumed that n is the form of $2^k$ (k is an integer of 0 or more) and is a exponentiation of 2.

For example, when n is 4 as illustrated in FIG. 3, the number of OR gates is smaller by 4 compared with that illustrated in FIG. 2. Table 2 below illustrates a comparison of the number of OR gates being used in a related art encoding method and the encoding method according to an exemplary embodiment.

TABLE 2

| | n | | | |
|---|---|---|---|---|
| | 2 | 4 | 8 | 16 |
| Related Art Encoder | 4 | 36 | 748 | 196,572 |
| Encoder of Exemplary Embodiment | 4 | 32 | 544 | 131,648 |
| Improvement | 0% | 11.1% | 27.3% | 33.0% |

Referring to Table. 2, as the number of encoding bits becomes greater, a greater gate reduction effect can be obtained.

The OR gates illustrated in FIG. 3 can be replaced with 4-input OR gates.

Figure 4:
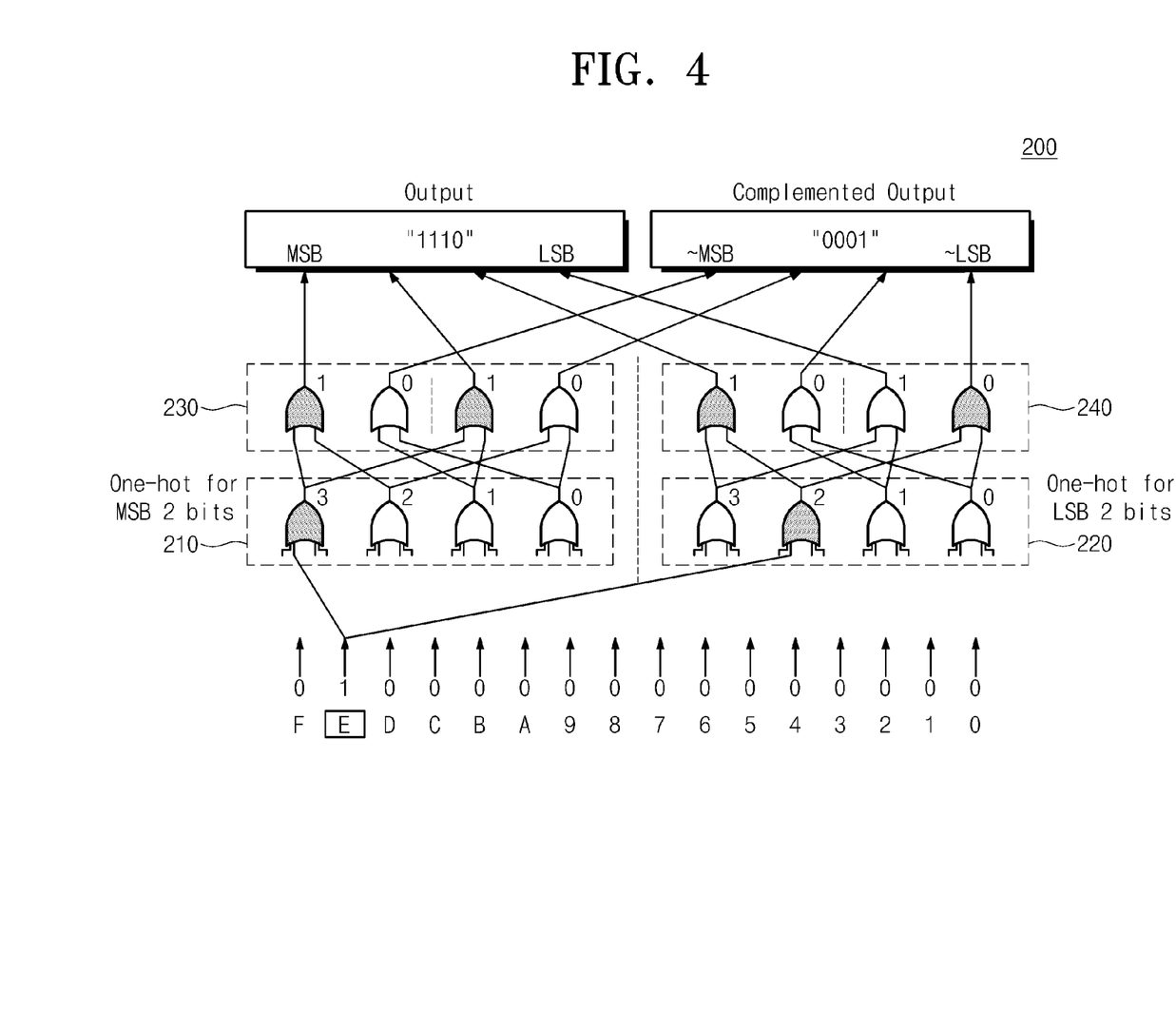
FIG. 4 is a diagram illustrating a 16-to-4 encoder in accordance with some other exemplary embodiments.

FIG. 4 is a drawing illustrating a 16-to-4 encoder in accordance with some other exemplary embodiments. Referring to FIG. 4, an encoder 200 includes a first bit generator 210, a second bit generator 220, a first encoder 230 and a second encoder 240. The first bit generator 210 and the first encoder 230 may form a first logic group and the second bit generator 220 and the second encoder 240 may form a second logic group. Each of the first bit generator 210 and the second bit generator 220 can be embodied using 4-input OR gates. Referring to FIG. 4, three OR gates illustrated in FIG. 3 are partly replaced with one 4-input OR gate. As a result, there are advantages in an area, a propagation delay and power consumption and robustness against SCA can be stronger.

The encoder 200 can greatly reduce a propagation delay by using a 4-input OR gate.

The 4-input OR gate can be embodied by a high fan-in gate. In the case of using a high fan-in gate, power consumption is low and there exists a strong characteristic in a gate counter and a SCA.

Table 3 below illustrates a comparison of the number of OR gates being used in a related art encoding method using a 4-input OR gate and the encoding method according to an exemplary embodiment.

TABLE 3

| | n | | | |
|---|---|---|---|---|
| | 2 | 4 | 8 | 16 |
| Related Art Encoder | 4 | 28.8 | 553.6 | 144,163.2 |
| Encoder of Exemplary Embodiment | 4 | 22.4 | 332.8 | 79,001.6 |
| Improvement | 0% | 22.2% | 40.0% | 45.2% |

Referring to Table 3, a gate counter reduction occurs in each case. Herein, one 4-input OR gate is calculated as 1.8 2-input OR gates. A greater effect exists in the encoding method according to an exemplary embodiment.

The encoder in accordance with some exemplary embodiments can be applied to a SBOX being used in a crypto algorithm such as a data encryption standard (DES) or an advanced encryption standard (AES).

Figure 5:
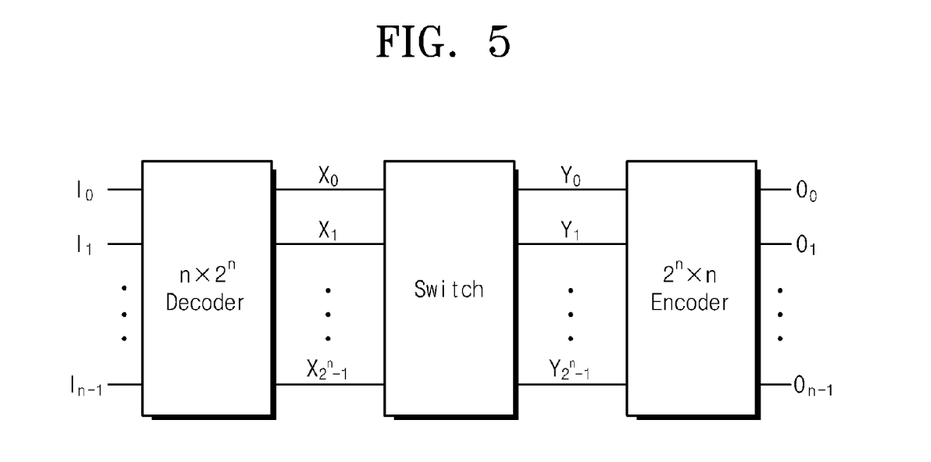
FIG. 5 is a block diagram illustrating an SBOX in accordance with some exemplary embodiments.

FIG. 5 is a block diagram illustrating an SBOX in accordance with some exemplary embodiments. Referring to FIG. 5, the SBOX is embodied in a decoder-switch-encoder (DSE) structure. The decoder and the encoder illustrated in FIG. 5 can be replaced with logic that applies an SCA countermeasure. The encoder can be embodied in the same way as the encoder 100 or the encoder 200 described in FIGS. 3 and 4, respectively.

Figure 6:
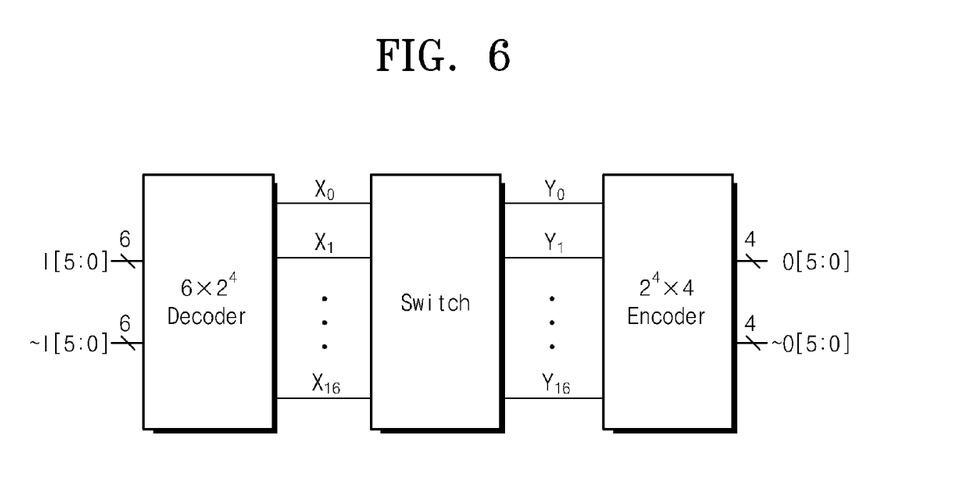
FIG. 6 is a block diagram illustrating an encoder in accordance with some exemplary embodiments is applied to a DES algorithm.

FIG. 6 is a drawing illustrating an exemplary embodiment in which an encoder in accordance with some exemplary embodiments is applied to a DES algorithm. The DES is embodied in an asymmetrical encoder-decoder structure. As illustrated in FIG. 6, the DES decodes 6-bit inputs (except a complementary input) to output a 16-bit output value (corresponding to 4-bit of encoding value). The generated 16 bits passes through a switch according to an SBOX structure of the DES algorithm to be encoded into 4 bits. The $2^4 \times 4$ encoder can be embodied in the same way as the encoder 100 described in FIG. 3 or the encoder 200 described in FIG. 4.

Figure 7:
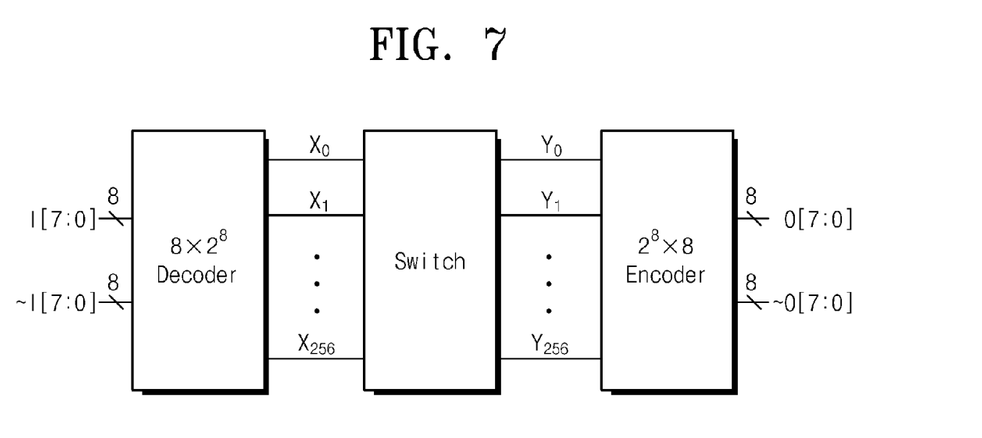
FIG. 7 is a block diagram illustrating an embodiment in which an encoder in accordance with some exemplary embodiments is applied to an AES algorithm.

FIG. 7 is a drawing illustrating an exemplary embodiment in which an encoder in accordance with some exemplary embodiments is applied to an AES algorithm. As illustrated in FIG. 7, the AES is an encoder structure in which n=8. The switch used here is embodied in an SBOX structure of the AES algorithm.

Referring to FIG. 7, a structure of the $2^8 \times 8$ encoder may be a structure in which the encoder 100 illustrated in FIG. 3 or the encoder 200 illustrated in FIG. 4 is extended.

Figure 8:
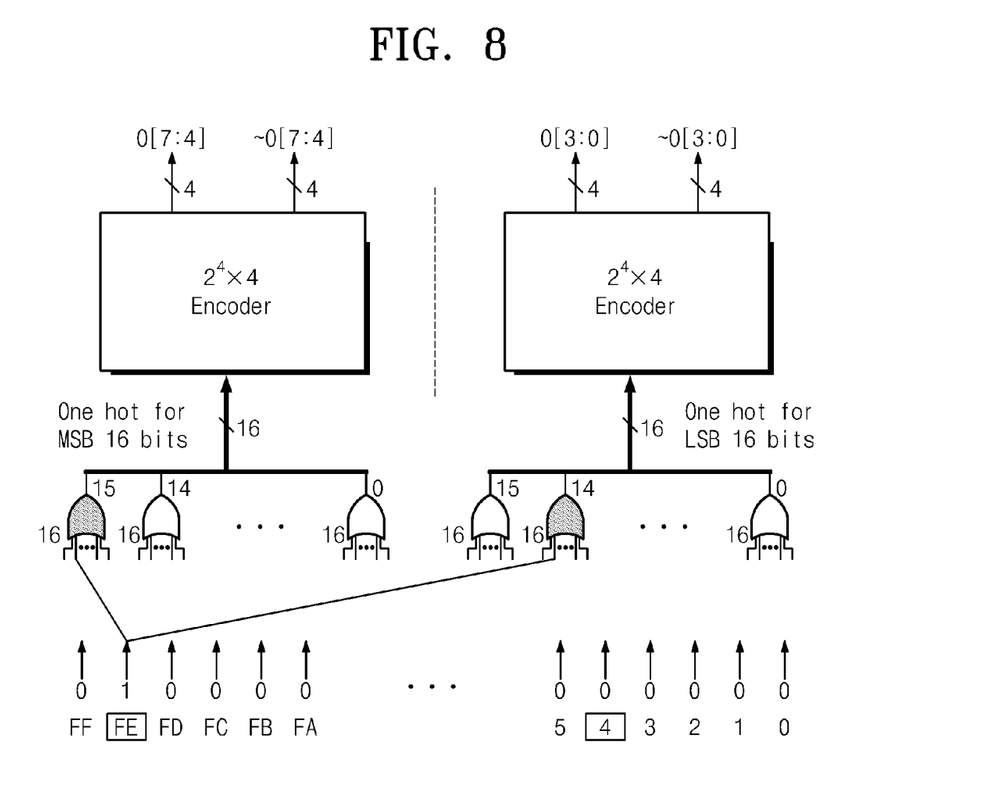
FIG. 8 is a diagram illustrating a 256-to-8 a one-hot encoder in accordance with some exemplary embodiments.

FIG. 8 is a drawing illustrating a 256-to-8 one hot encoder in accordance with some exemplary embodiments. Referring to FIG. 8, the $2^4 \times 4$ encoder can be embodied by the encoder 100 illustrated in FIG. 3 or the encoder 200 illustrated in FIG. 4. Each of the 32 OR gates used in FIG. 8 has 16 inputs. The OR gates can be replaced with a 2-input OR gate, a 4-input OR gate or an OR gate having a different number of inputs.

In FIGS. 2 through 8, a one-hot encoder using an OR gate was described. However, the inventive concept is not limited thereto and the same concept can be applied in a variety of forms.

For example, the inventive concept can be applied to a one-cold encoder. In this case, an OR gate used in the encoding is replaced with an AND gate and the "divide-and-conquer" method can be applied.

Figure 9:
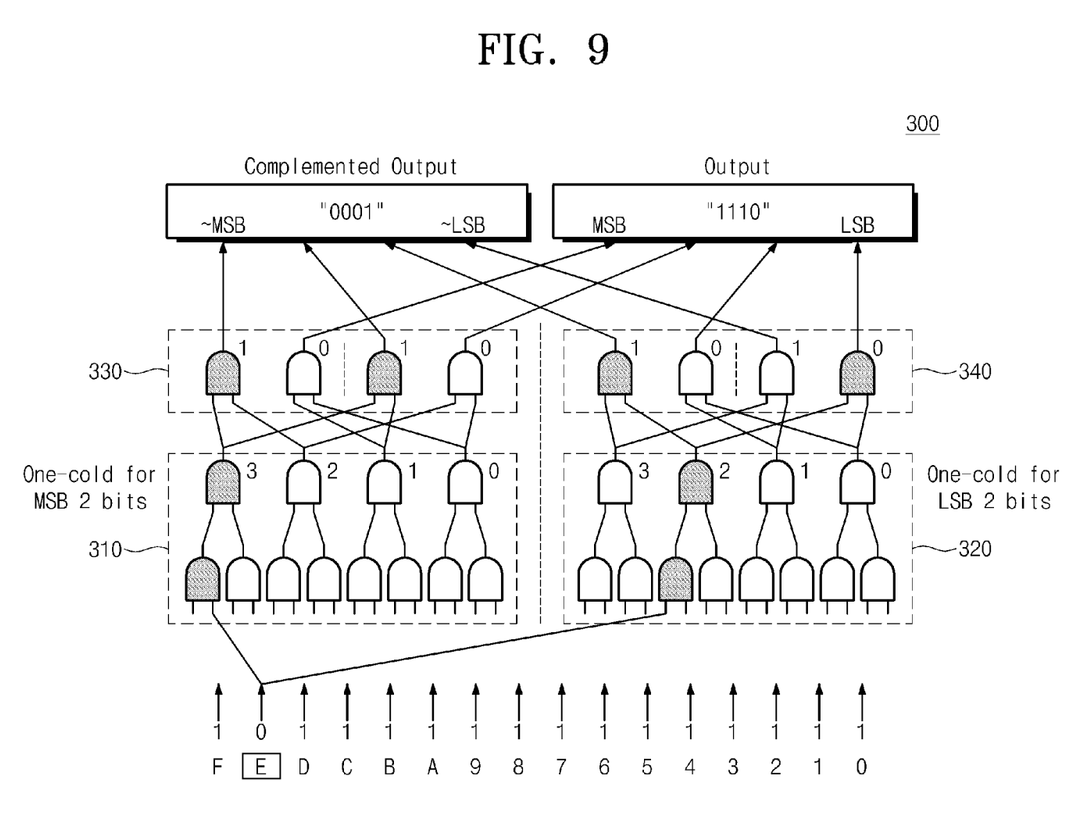
FIG. 9 is a diagram illustrating a one-cold encoder in accordance with some exemplary embodiments.

FIG. 9 is a drawing illustrating a one-cold encoder in accordance with some exemplary embodiments. Referring to FIG. 9, the encoder 300 includes a first bit generator 310, a second bit generator 320, a first encoder 330 and a second encoder 340.

In FIG. 3, among input values of the encoder 100, an input wire corresponding to "E" is high and the remaining wires are low. However, among input values of the encoder 300 in FIG. 9, an input wire corresponding to "E" is low and the remaining wires are high. The OR gates are replaced with AND gates, and the positions of the complementary output and the output are changed.

In FIGS. 2 through 9, OR gates or AND gates are used but the inventive concept can be embodied using various types of gates. For example, the encoder of the inventive concept can be variously embodied using NOR gates and NAND gates.

Figure 10:
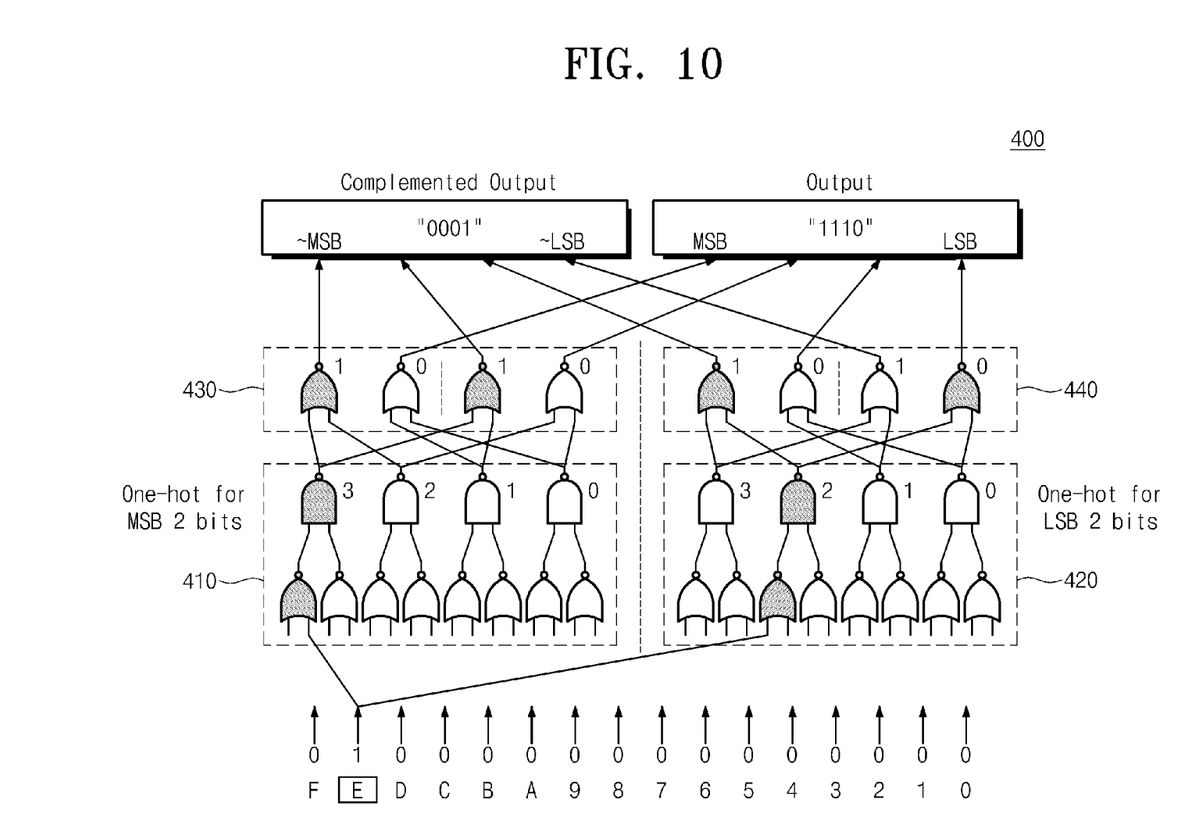
FIG. 10 is a diagram illustrating a one-hot encoder in accordance with some other exemplary embodiments.

FIG. 10 is a drawing illustrating a one-hot encoder in accordance with some other exemplary embodiments. Referring to FIG. 10, a one-hot encoder 400 includes a first bit generator 410, a second bit generator 420, a first encoder 430 and a second encoder 440.

A structure of the one-hot encoder 400 is a structure in which the encoder 100 illustrated in FIG. 3 is changed to a structure using NOR gates and NAND gates.

Referring to FIG. 10, even though an input is given as a one-hot, whenever passing through a row of the NOR gates or the NAND gates, one-hot and one-cold cross each other.

The encoder in accordance with some exemplary embodiments can be embodied to include other functions. For example, the encoder may include a precharge function.

Figure 11:
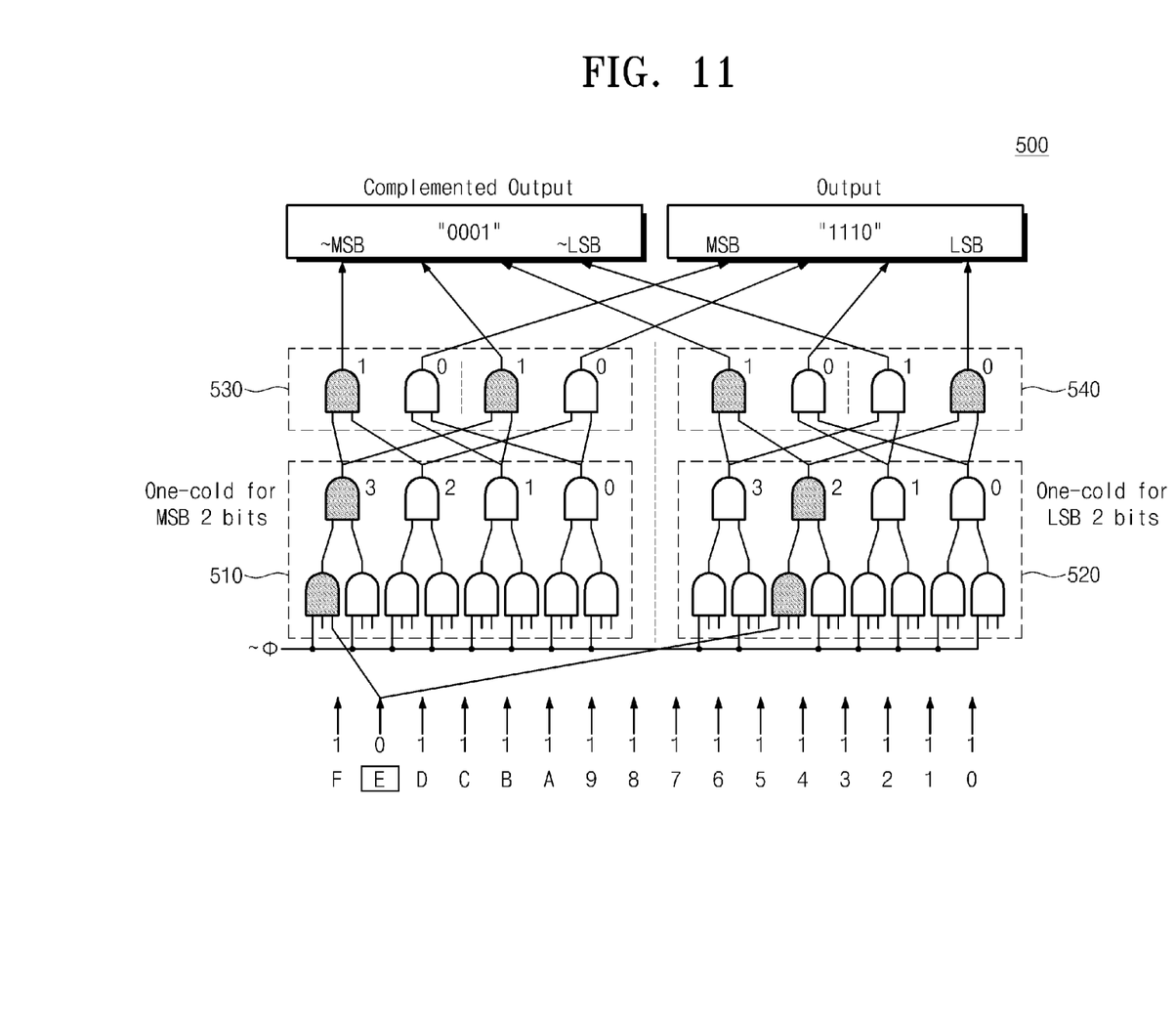
FIG. 11 is a diagram illustrating an encoder including a precharge function in accordance with some exemplary embodiments.

FIG. 11 is a drawing illustrating an encoder including a precharge function in accordance with some exemplary embodiments. Referring to FIG. 11, an encoder 500 includes a first bit generator 510, a second bit generator 520, a first encoder 530 and a second encoder 540. As illustrated in FIG. 11, the encoder 500 can be more effectively constituted by increasing a fan-in of the encoder instead of disposing a separate AND gate for precharge logic. In FIG. 11, the first bit generator 510 and the second bit generator 520 use a 3-input AND gate respectively but the encoder 500 of the inventive concept can use different forms of gates.

The encoder suggested by the inventive concept can be applied to not only to the AES and the DES but also to various sizes of encoders with respect to various algorithms.

Figure 12:
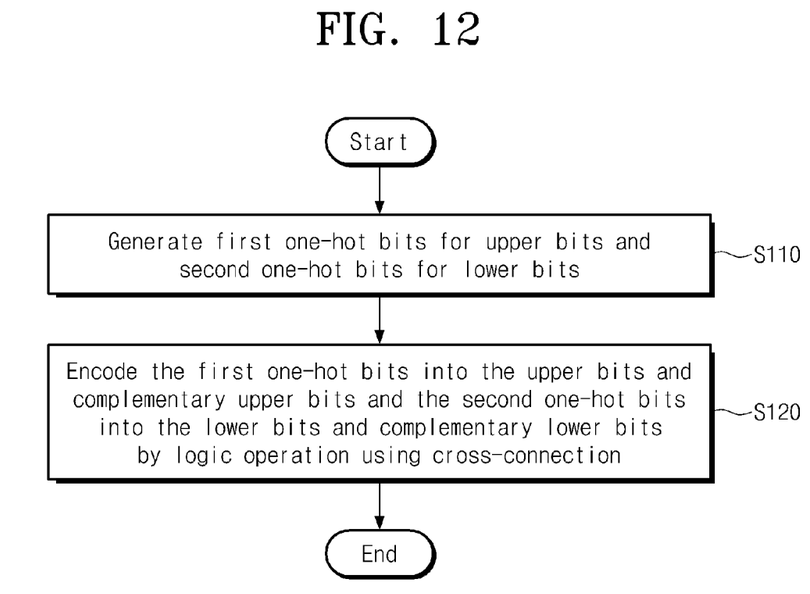
FIG. 12 is a flow chart illustrating a method for encoding of an encoder in accordance with some exemplary embodiments.

FIG. 12 is a flow chart illustrating a method for encoding of an encoder in accordance with some exemplary embodiments. Referring to FIGS. 1 through 12, the encoding method proceeds as follows.

Using an input one-hot bit, first one-hot bits for MSBs and second one-hot bits for LSBs are generated (S110). The first one-hot bits are encoded into MSBs and complementary MSBs using a cross-connection and the second one-hot bits are encoded into LSBs and complementary LSBs using a cross-connection (S120).

The encoding method in accordance with some exemplary embodiments generates two one-hot bits and encodes the generated one-hot bits using a cross-connection.

Figure 13:
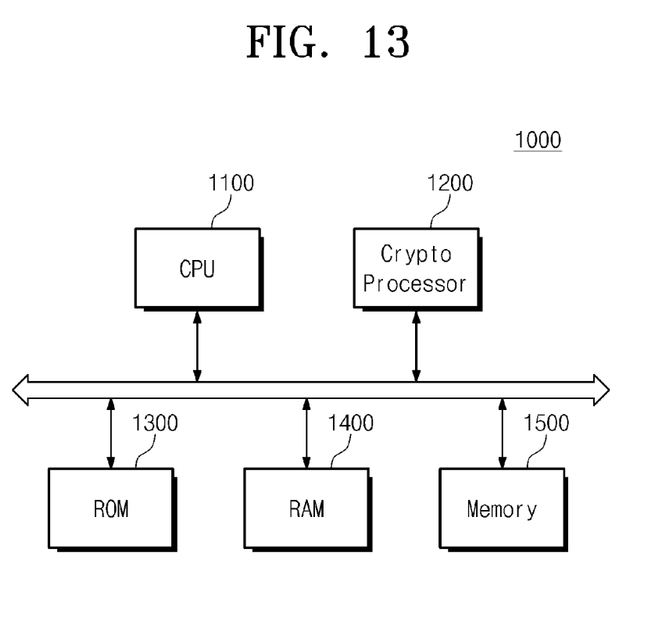
FIG. 13 is a block diagram illustrating a security system having a crypto processor in accordance with some exemplary embodiments.

FIG. 13 is a block diagram illustrating a security system having a crypto processor in accordance with some exemplary embodiments. Referring to FIG. 13, a security system 1000 includes a central processing unit (CPU) 1100, a crypto processor 1200, a read only memory (ROM) 1300, a random access memory (RAM) 1400 and a memory 1500.

The CPU 1100 controls an overall operation of the security system 1000. The crypto processor 1200 decodes a command capable of code, certification and electronic signature, and processes data. The crypto processor 1200 can perform a coding and decoding operation using the encoding method described in FIG. 12. The ROM 1300 and the crypto processor 1200 store data used to drive the security system 1000. The memory 1500 stores data used to drive the crypto processor 1200.

The security system 1000 in accordance with some exemplary embodiments protects against a power analysis attack and reduces a chip size as compared with that of the related art security system.

As described above, the encoder and the encoding method protect against a power analysis attack and reduce a chip size by generating one-hot/one-cold bits and encoding the generated one-hot/one-cold bits into MSB/LSB and complementary MSB/LSB through a logical operation using a cross-connection.

Although a few exemplary embodiments have been shown and described, it will be appreciated by those skilled in the art that changes may be made in these exemplary embodiments without departing from the principles and spirit of the present inventive concept, the scope of which is defined in the appended claims and their equivalents. Therefore, the above-disclosed subject matter is to be considered illustrative, and not restrictive.

What is claimed is:

1. A method for encoding of an encoder comprising:
generating, using first logic gates provided in a processor, first one-hot bits for most significant bits (MSBs) using input one-hot bits and, using second logic gates provided in the processor, second one-hot bits for least significant bits (LSBs) using the input one-hot bits; and
encoding the first one-hot bits to the MSBs and complementary MSBs through a first logical operation using a cross-connection;
encoding the second one-hot bits to the LSBs and complementary LSBs through a second logical operation using a cross-connection.

2. The method of claim 1, wherein the input one-hot bits are 2n, and
wherein the MSBs and the LSBs are n/2 bits.

3. The method of claim 1, wherein the first one-hot bits and the second one-hot bits are generated using a divided and conquer technique.

4. The method of claim 3, wherein the generating the first one-hot bits and the second one-hot bits comprises performing a 2-input OR operation on the input one-hot bits.

5. The method of claim 1, wherein the generating the first one-hot bits and the second one-hot bits comprises performing a 4-input OR operation on the input one-hot bits.

6. The method of claim 1, wherein the first logical operation is the same as the second logical operation.

7. The method of claim 1, wherein each of the first logical operation and the second logical operation performs a 2-input OR operation on the first one-hot bits and the second one-hot bits respectively.

8. The method of claim 1, further comprising precharging the one-hot bits.

9. An encoder comprising:
a first bit generator configured to generate, using first logic gates provided in a processor, 2n/2 one-hot bits or 2n/2 one-cold bits for most significant bits (MSBs) using input 2n bits;
a second bit generator configured to generate, using second logic gates provided in the processor, 2n/2 one-hot bits or 2n/2 one-cold bits for least significant bits (LSBs) using the input 2n bits;
a first encoder configured to encode outputs of the first bit generator into the MSBs and complementary MSBs through a first logical operation using a cross-connection; and
a second encoder configured to encode outputs of the second bit generator into the LSBs and complementary LSBs through a second logical operation using a cross-connection.

10. The encoder of claim 9, wherein the input 2n bits are one of one-hot bits or one-cold bits.

11. The encoder of claim 9, wherein each of the first bit generator and the second bit generator is configured to perform a 2-input OR operation on the input 2n bits and perform a 2-input OR operation on a result of the 2-input OR operation.

12. The encoder of claim 9, wherein each of the first bit generator and the second bit generator is configured to perform a 4-input OR operation on the input 2n bits.

13. The encoder of claim 9, wherein each of the first logical operation and the second logical operation performs a 2-input OR operation on outputs of each of the first bit generator and the second bit generator.

14. The encoder of claim 9, wherein each of the first bit generator and the second bit generator is configured to perform a 2-input AND operation on the input 2n bits and perform a 2-input AND operation on a result of the 2-input AND operation, and
wherein each of the first encoder and the second encoder is configured to perform a 2-input AND operation on outputs of each of the first bit generator and the second bit generator.

15. The encoder of claim 10, wherein each of the first bit generator and the second bit generator is configured to perform a 3-input AND operation on the input 2n bits and a clock signal, and perform a 2-input AND operation on a result of the 3-input AND operation, and
wherein each of the first encoder and the second encoder is configured to perform a 2-input AND operation on outputs of each of the first bit generator and the second bit generator.

16. An encoder comprising:
a first logic group configured to generate most significant bits (MSBs) and complementary MSBs of a 2n/2 bit output from input 2n bits using a plurality of first logic gates, the first logic group comprising a first encoder configured to encode the 2n/2 bit output into the MSBs and complementary MSBs, a portion of the plurality of first logic gates being electrically connected using cross-connections; and a second logic group configured to generate least significant bits (LSBs) and complementary LSBs of a 2n/2 bit output from the input 2n bits using a plurality of second logic gates, the second logic group comprising a second encoder configured to encode the 2n/2 bit output into the LSBs and complementary LSBs, a portion of the plurality of second logic gates being electrically connected using cross-connections.

17. The encoder of claim 16, wherein the first logic gates and the second logic gates are OR gates.

18. The encoder of claim 16, wherein the first logic gates and the second logic gates are AND gates.

19. The encoder of claim 16, wherein the first logic gates comprise NAND and NOR gates, and the second logic gates comprise NAND and NOR gates.

20. The encoder of claim 16, wherein:

the first logic group comprises:

a first bit generator configured to generate 2n/2 one-hot bits or 2n/2 one-cold bits from the input 2n bits, wherein the first encoder is configured to encode an output of the first bit generator into the MSBs and complementary MSBs, wherein outputs of the first bit encoder are connected to inputs of the first encoder using the cross-connections; and the second logic group comprises:

a second bit generator configured to generate 2n/2 one-hot bits or 2n/2 one-cold bits for the input 2n bits, wherein the second encoder is configured to encode an output of the second bit generator into the LSBs and complementary LSBs, wherein outputs of the second bit encoder are connected to inputs of the second encoder using the cross-connections.

\* \* \* \* \*